(12) United States Patent
Lindacher et al.

(10) Patent No.: US 9,557,579 B2
(45) Date of Patent: *Jan. 31, 2017

(54) PRESBYOPIC TREATMENT SYSTEM

(71) Applicant: Novartis AG, Basel (CH)

(72) Inventors: Joseph Michael Lindacher, Suwanee, GA (US); Shyamant Ramana Sastry, Suwanee, GA (US)

(73) Assignee: NOVARTIS AG, Basel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,303

(22) Filed: Apr. 22, 2015

(65) Prior Publication Data

US 2015/0226981 A1 Aug. 13, 2015

Related U.S. Application Data

(63) Continuation of application No. 14/167,648, filed on Jan. 29, 2014, now Pat. No. 9,039,172, which is a continuation of application No. 13/162,182, filed on Jun. 16, 2011, now Pat. No. 8,672,474, which is a continuation of application No. 12/229,125, filed on Aug. 20, 2008, now abandoned.

(60) Provisional application No. 61/125,215, filed on Apr. 23, 2008, provisional application No. 60/957,183, filed on Aug. 22, 2007.

(51) Int. Cl.
*G02C 7/04* (2006.01)
*G02C 7/02* (2006.01)
*G02C 7/06* (2006.01)

(52) U.S. Cl.
CPC ............... *G02C 7/044* (2013.01); *G02C 7/027* (2013.01); *G02C 7/028* (2013.01); *G02C 7/041* (2013.01); *G02C 7/042* (2013.01); *G02C 7/047* (2013.01); *G02C 7/061* (2013.01); *G02C 2202/08* (2013.01)

(58) Field of Classification Search
CPC ......... G02C 7/028; G02C 7/042; G02C 7/044; G02C 7/041; G02C 7/061; G02C 2202/08
USPC ............ 351/159.02, 159.12–159.13, 159.33, 159,351/159.73–159.74
See application file for complete search history.

(56) References Cited

U.S. PATENT DOCUMENTS 4,195,919 A 4/1980 Shelton
5,754,270 A 5/1998 Rehse
(Continued)

FOREIGN PATENT DOCUMENTS

EP 0766951 A1 4/1997
EP 0942312 A2 9/1999
(Continued)

*Primary Examiner* — Scott J Sugarman
(74) *Attorney, Agent, or Firm* — Robert A. Ambrose (57) ABSTRACT

A method and system for treating Presbyopia and pre-Presbyopia are provided that do not compromise the wearer's intermediate or distance vision. The system is a lens and a lens series, wherein the power profiles of the lenses are tailored to provide an amount of positive ADD power in the near vision zone that is slightly less than that which is normally required for near vision accommodation, while also providing an amount of negative spherical aberration in the peripheral optical zone. The dynamic ocular factors of the wearer's eye work in conjunction with the positive ADD power provided by the central optical zone and with the effective ADD gained from the negative spherical aberration provided by the peripheral optical zone to induce a minimally discernible amount of blur that is tuned to maximize the wearer's depth of focus.

18 Claims, 7 Drawing Sheets

(56) References Cited

U.S. PATENT DOCUMENTS

| | | | |
|---|---|---|---|
| 5,771,088 A | 6/1998 | Perrott | |
| 5,815,239 A | 9/1998 | Chapman | |
| 6,030,077 A | 2/2000 | Sawano | |
| 6,244,708 B1 | 6/2001 | Chapman | |
| 6,457,826 B1 | 10/2002 | Lett | |
| 6,474,814 B1 | 11/2002 | Griffin | |
| 6,554,425 B1 | 4/2003 | Roffman | |
| 6,899,425 B2 | 5/2005 | Roffman | |
| 7,101,041 B2 | 9/2006 | Lindacher | |
| 8,672,474 B2 * | 3/2014 | Lindacher | G02C 7/028 351/159.05 |
| 9,039,172 B2 * | 5/2015 | Lindacher | G02C 7/028 351/159.05 |
| 2004/0021824 A1 | 2/2004 | Ye | |
| 2005/0041203 A1 | 2/2005 | Lindacher | |
| 2005/0099595 A1 | 5/2005 | Lindacher | |
| 2006/0170861 A1 | 8/2006 | Lindacher | |
| 2006/0215109 A1 | 9/2006 | Lindacher | |
| 2008/0212022 A1 | 9/2008 | Ye | |
| 2008/0291393 A1 | 11/2008 | Menezes | |

FOREIGN PATENT DOCUMENTS

| | | |
|---|---|---|
| EP | 0987578 A2 | 3/2000 |
| EP | 0996023 A2 | 4/2000 |
| EP | 1331505 A2 | 7/2003 |
| WO | 0135880 A1 | 5/2001 |
| WO | 0221194 A2 | 3/2002 |
| WO | 2005/019906 A1 | 3/2005 |

\* cited by examiner

PRESBYOPIC TREATMENT SYSTEM

This application is a continuation of U.S. patent application Ser. No. 14/167,648, filed Jan. 29, 2014, which is a continuation of 13/162,182, filed Jun. 16, 2011, which is a continuation of U.S. patent application Ser. No. 12/229,125, filed Aug. 20, 2008, which claims the benefits under 35 USC 119(e) of U.S. Provisional Patent Application Nos. 60/957,183 filed Aug. 22, 2007 and 61/125,215 filed Apr. 23, 2008, the contents of each of which are herein incorporated by reference in their entireties.

TECHNICAL FIELD OF THE INVENTION

The invention relates to a system for treating Presbyopia. More particularly, the invention relates to a lens and a lens series that can be worn by a person to correct, or treat, symptoms of Presbyopia.

BACKGROUND OF THE INVENTION

Presbyopia is a gradual loss of accommodation of the visual system of the human eye. This is due to an increase in the modulus of elasticity and growth of the crystalline lens of the eye that is located just behind the iris and the pupil. Tiny muscles in the eye called ciliary muscles pull and push the crystalline lens, thereby causing the curvature of the crystalline lens to adjust. This adjustment of the curvature of the crystalline lens results in an adjustment of the eye's focal power to bring objects into focus. As individuals age, the crystalline lens of the eye becomes less flexible and elastic, and, to a lesser extent, the ciliary muscles become less powerful. These changes result in inadequate adjustment of the lens of the eye (i.e., loss of accommodation) for various distances, which causes objects that are close to the eye to appear blurry.

In most people, the symptoms of Presbyopia begin to become noticeable under normal viewing conditions at around age 40, or shortly thereafter. However, Presbyopia actually begins to occur before the symptoms become noticeable and increases throughout a person's lifetime. In general, a person is deemed "symptomatic" when the residual accommodation is less than that required for one to read. Typical reading distance requires an accommodation ADD of 2.0 to 3.0 Diopters. Eventually, the residual accommodation is reduced to the point at which the individual becomes an absolute Presbyope after age 50. Symptoms of Presbyopia result in the inability to focus on objects close at hand. As the lens hardens, it is unable to focus the rays of light that come from nearby objects. People that are symptomatic typically have difficulty reading small print, such as that on computer display monitors, in telephone directories and newspaper advertisements, and may need to hold reading materials at arm's length.

There are a variety of non-surgical systems that are currently used to treat Presbyopia, including bifocal spectacles, progressive (no-line bifocal) spectacles, reading spectacles, bifocal contact lenses, and monovision contact lenses. Surgical systems include, for example, multifocal intraocular lenses (IOLs) and accommodation IOLs inserted into the eye and vision systems altered through corneal ablation techniques. Each of these systems has certain advantages and disadvantages relative to the others. With bifocal spectacles, the top portion of the lens serves as the distance lens while the lower portion serves as the near vision lens. Bifocal contact lenses generally work well for patients who have a good tear film (i.e., moist eyes), good binocular vision (i.e., ability to focus both eyes together), good visual acuity (i.e., sharpness) in each eye, and no abnormalities or disease in the eyelids. The bifocal contact lens wearer must invest the time required to maintain contact lenses, and generally should not be involved in occupations that impose high visual demands on the person. Furthermore, bifocal contact lenses may limit binocular vision. In addition, bifocal contact lenses are relatively expensive, in part due to the time it takes the patient to be accurately fitted.

An alternative to spectacles and bifocal contact lenses are monovision contact lenses. With monovision contact lenses, one lens of the pair corrects for near vision and the other corrects for distance vision. For an emmetropic individual, i.e., an individual who does not require distance vision correction, only a single contact lens is worn in one eye to correct for near vision. With non-emmetropic individuals, one of the monovision contact lenses sets the focus of one eye, typically the dominate eye, at distance and the other lens adds a positive power bias to the other eye. The magnitude of the positive power bias depends on the individual's residual accommodation and near vision requirements. Individuals with low ADD requirements typically adapt very well to monovision contact lenses. Advantages of monovision are patient acceptability, convenience, and lower cost. Disadvantages include headaches and fatigue experienced by the wearer during the adjustment period and decreases in visual accuity, which some people find unacceptable. As the ADD difference is increased, a loss of depth perception, night vision and intermediate vision limits its effectiveness of monovision systems.

Simultaneous vision multifocal contact lenses are also used to treat Presbyopia. Types of multifocal contact lenses include, but are not limited to, center distance power designs, center near power designs, annular power designs, diffractive power designs, and the like. Center near power designs are multifocal, or progressive, contact lenses used to treat Presbyopia. These lenses have a near vision zone in the center of the lens that extends outwardly a distance away from the center of the lens and a distance vision zone that is on the periphery of the lens and is concentric with and surrounds the near vision zone. With more modern multifocal contact lenses, known as progressive contact lenses, the transition between the near and distance vision regions is more gradual than in earlier designs. The ADD power is highest in the near vision region of the lens and lowest or zero in the distance vision region of the lens. In the transition region, the power continuously decreases from near vision ADD power to distance vision ADD power (or no ADD power) as the lens transitions from the near vision zone to the distance vision zone.

While multifocal lenses generally are effective at treating symptoms of Presbyopia, there are many disadvantages associated with multifocal lenses. Multifocal lenses designed to treat symptoms of Presbyopia normally have relatively high ADD powers in the near vision zone of the lens to provide the correction needed for near vision. The high ADD power in the near vision zone can result in visual artifacts, or ghost images, that affect the wearer's intermediate vision and can result in other problems that compromise the wearer's distance vision.

Another shortcoming of current Presbyopic treatment systems is that most are ineffective at treating pre-Presbyopia, or emerging Presbyopia. Even prior to the symptoms of Presbyopia becoming readily noticeable to a person, that person may be experiencing pre-Presbyopia symptoms, such as inability of the vision system of the eye to accommodate in conditions of darkness or low lighting. Progressive multifocal lenses with very high near vision ADD powers are not suitable for use to treat pre-Presbyopia. CooperVision, Inc., a company headquartered in Fairport, N.Y., recently began testing a contact lens that it claims is effective at treating pre-Presbyopia, but insufficient information is currently available about this product to verify that the lens is actually effective at treating pre-Presbyopia.

Accordingly, a need exists for a system for treating Presbyopia and pre-Presbyopia that is effective and that does not compromise the wearer's intermediate or distance vision through the stages of Presbyopia.

SUMMARY OF THE INVENTION

The invention provides a lens and a lens series for treating Presbyopia and pre-Presbyopia. Each lens comprises a central optical zone, a peripheral optical zone and a transition zone. The central optical zone has a power profile that provides an ADD power ranging from a maximum ADD power of between about 0 diopters and about 2.4 diopters and a minimum ADD power of between about 0 diopters and 0.2 diopters. The peripheral optical zone has a power profile that provides an amount of negative spherical aberration between a semi-diameter of about 2 mm and a semi-diameter of about 3 mm. The difference between the amount of negative spherical aberration provided at the inner semi-diameter of the peripheral optical zone and the amount of negative spherical aberration provided at the outer semi-diameter of the peripheral optical zone ranges from a minimum absolute value of about 0.65 diopters and a maximum absolute value of about 1.25 diopters. The transition zone of the lens is interposed between and connected to the central optical zone and the peripheral optical zone and provides a transition between the central optical zone and the peripheral optical zone. The transition zone has a power profile that is continuous.

The invention provides a method for designing a lens series for treating Presbyopia wherein each lens of the series has a power profile that provides the central optical zone with a selected amount of ADD power and that provides the peripheral optical zone with a selected amount of negative spherical aberration. A transition zone is interposed between and connected to the central optical zone and the peripheral optical zone, and provides a transition between the central optical zone and the peripheral optical zone. The power profiles for each lens are defined by the same mathematical function, except that the dc bias terms in the function for each lens of the series are different.

In accordance with another embodiment, the invention provides a method for designing a lens for treating Presbyopia comprising selecting a power profile for a central optical zone of the lens, selecting a power profile for a peripheral optical zone of the lens, and selecting a power profile for a transition zone of the lens. The power profile of the central optical zone is selected to provide an ADD power ranging from a maximum ADD power of between about 0 diopters and about 2.4 diopters and a minimum ADD power of between about 0 diopters and 0.2 diopters. The peripheral optical zone has a power profile that provides an amount of negative spherical aberration between a semi-diameter of about 2 mm and a semi-diameter of about 3 mm. The difference between the amount of negative spherical aberration provided at the inner semi-diameter of the peripheral optical zone and the amount of negative spherical aberration provided at the outer semi-diameter of the peripheral optical zone ranges from a minimum absolute value of about 0.65 diopters and a maximum absolute value of about 1.25 diopters. The transition zone is interposed between and connected to the central optical zone and the peripheral optical zone and provides a transition between the central optical zone and the peripheral optical zone. The power profile selected for the transition zone is continuous.

These and other features and advantages of the invention will become apparent from the following description, drawings and claims.

DETAILED DESCRIPTION OF ILLUSTRATIVE EMBODIMENTS

The invention relates to a treatment system for treating Presbyopia and pre-Presbyopia that does not compromise the wearer's intermediate or distance vision. For ease of discussion, the terms "Presbyopia" and "pre-Presbyopia" will be referred to hereinafter as simply "Presbyopia". The invention is directed to a lens series comprising lenses that are tailored to provide an amount of positive ADD power in the central optical zone that is tuned to the residual accommodation and the dynamics of the individual's visual system and to provide an amount of negative spherical aberration in the peripheral optical zone. As an eye accommodates for a near vergence, the pupil constricts (myosis) and the spherical aberration of the optical system becomes more negative. These dynamic ocular factors act to increase the depth of focus of the individual's visual system. In essence, these dynamic ocular factors work in conjunction with the positive ADD power provided by the central optical zone of the lens and with the effective ADD gained from the negative spherical aberration provided by the peripheral optical zone of the lens to induce a minimally discernible amount of blur. The combination of all of these factors results in a minimally discernible amount of blur that is tuned to maximize the individual's depth of focus. The manner in which these goals are achieved will now be described with reference to a few illustrative embodiments of the invention.

The lenses of the invention are described herein in terms of dioptric power profiles. A lens series is defined herein as the range of ADD powers for a given ADD parameter. For example, a typical spherical lens series has ADD powers that range from −10 diopters to +6 diopters in 0.25-diopter steps. An ADD parameter is the aberration or dioptric power perturbation in the optical zone needed to increase the depth of focus by a target magnitude. The magnitude and functional form of the perturbation of a given ADD parameter is targeted for a given magnitude of residual accommodation. Thus, a particular ADD parameter is associated with all of the lenses in a particular lens series. Multiple ADD parameters are possible, and each ADD parameter targets a particular stage of Presbyopia. All of the power profiles of a given series are defined by the same equation, except that the dc term of the equation is different for each lens of the lens series. Therefore, a particular equation having particular coefficients and mathematical operators corresponds to the ADD parameter, whereas the dc term in that equation corresponds to the ADD power.

Figure 1:
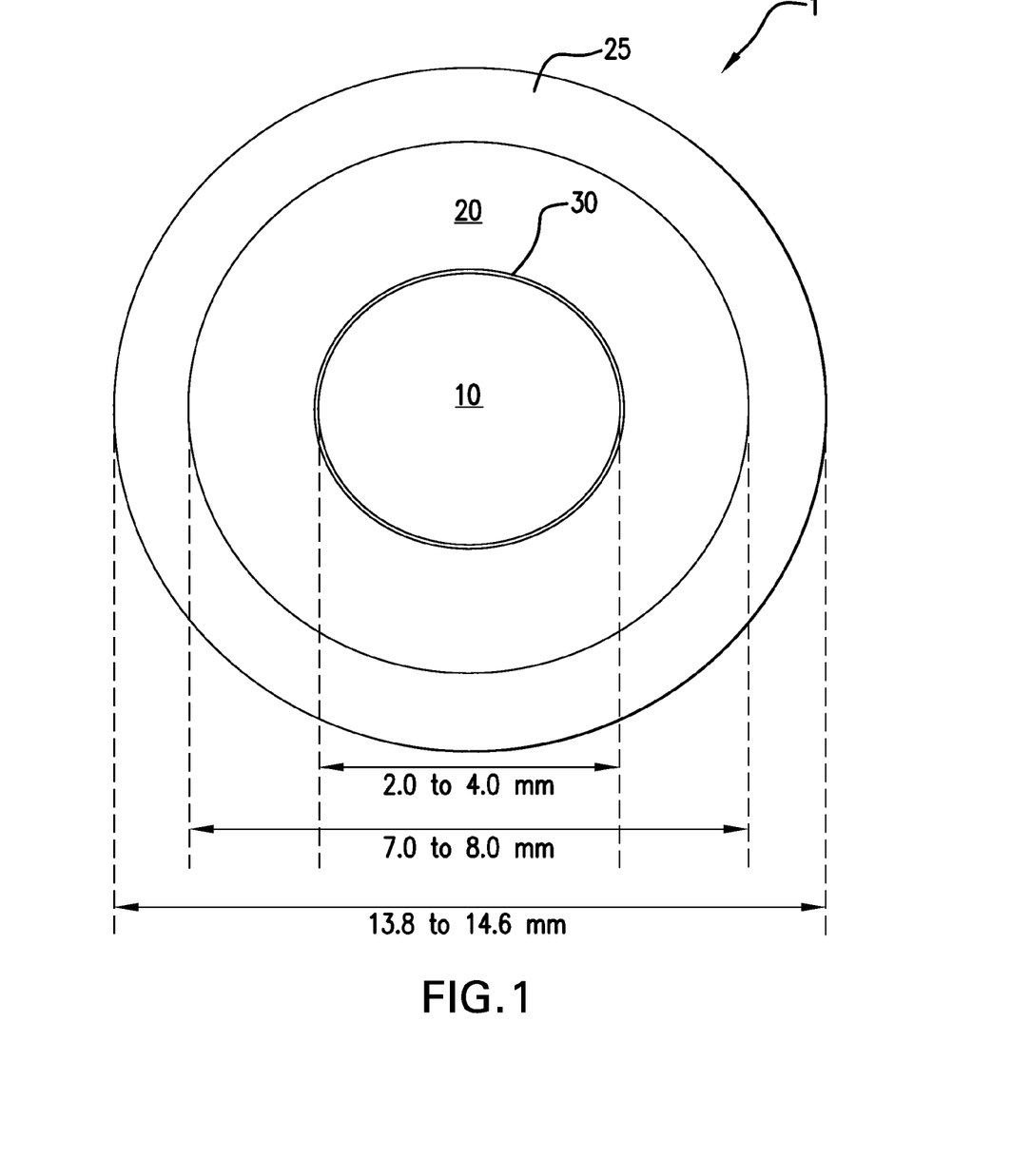
FIG. 1 illustrates a plan view of a contact lens in accordance with an illustrative embodiment of the invention.

FIG. 1 illustrates a plan view of a contact lens 1 in accordance with an illustrative embodiment of the invention. For purposes of describing the principles and concepts of the invention, it will be assumed that a contact lens in accordance with the invention has at least a central optical zone 10, a peripheral optical zone 20, and a transition zone 30 that bridges the central optical zone 10 to the peripheral optical zone 20. For these purposes, the entire optical zone of a contact lens in accordance with the invention will be assumed to comprise the central optical zone 10, the transition zone 30 and the peripheral optical zone 20, although any of these zones may be made up of multiple zones.

For a typical contact lens, the entire optical zone is about 7.0 to 8.0 millimeters (mm) in diameter. For the purposes of describing the principles and concepts of the invention, it will be assumed that the central optical zone ranges in diameter from about 2.0 to about 4.0 mm, and preferably is about 3.0 mm in diameter. The peripheral optical zone 20 is an annulus surrounding the central optical zone 10. Outside of the peripheral optical zone 20 is an outer peripheral region 25 that generally does not serve any optical purpose, but serves the purpose of fitting the anterior surface of the lens 1 to the surface of the eye. The entire lens 1, including this outer peripheral region 25 is typically about 13.8 mm to about 14.60 mm in diameter.

Figure 2:
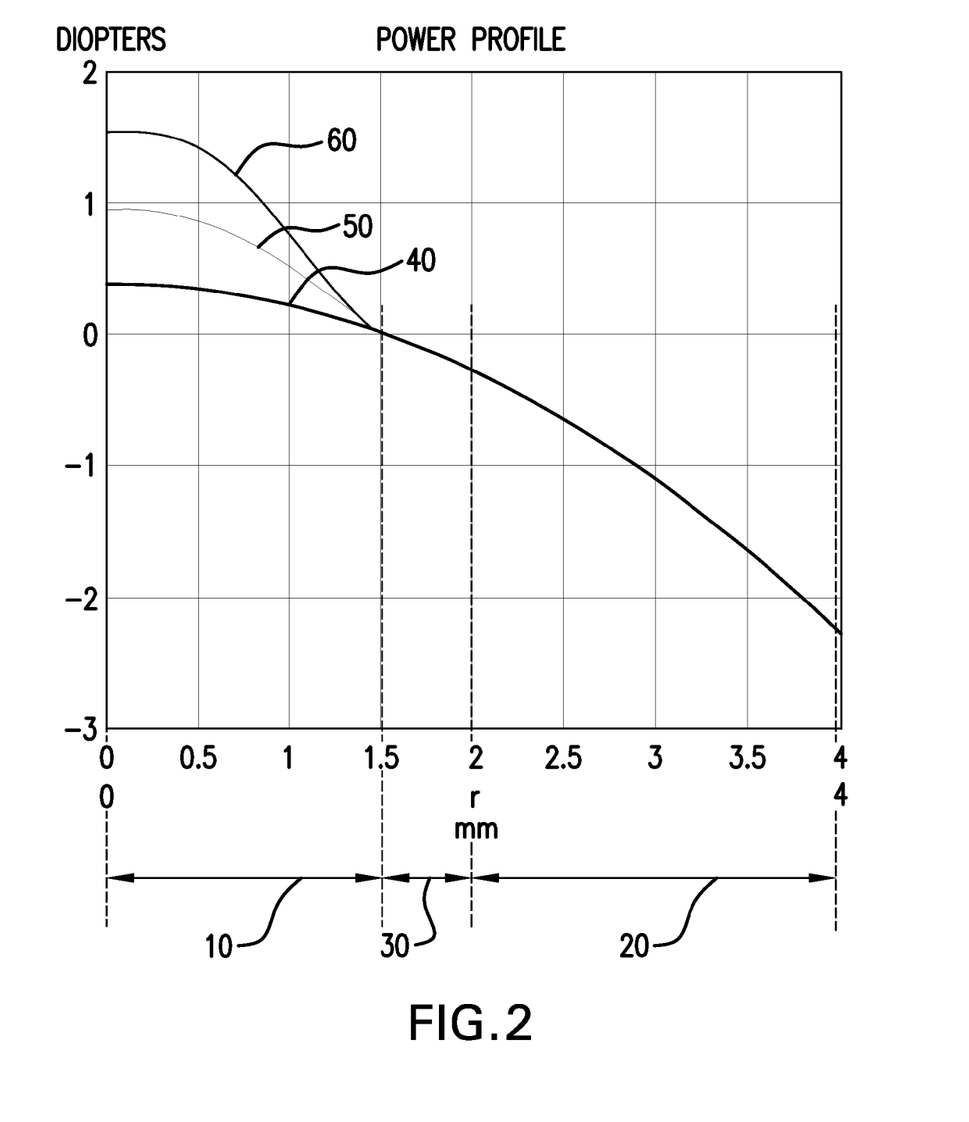
FIG. 2 illustrates a plot of three different power profiles that represent examples of power profiles that are suitable for the lens shown in FIG. 1.

FIG. 2 illustrates a plot of three different power profiles 40, 50 and 60 that represent examples of power profiles that are suitable for the lens 1 shown in FIG. 1. The vertical axis in the plot represents optical power in diopters and the horizontal axis represents radius from the center of the lens outward in millimeters. As stated above, in accordance with the invention, it has been determined that Presbyopia can be effectively treated by using a lens that provides an amount of positive ADD power in the central optical zone that is slightly less than that which is normally required for near vision accommodation if a selected magnitude of negative spherical aberration is provided by the peripheral optical zone. The reason that a lens having this type of profile is effective at treating Presbyopia is that the selected magnitude of negative spherical aberration provided by the peripheral optical zone works in conjunction with the residual accommodation of the individual's eye to extend the eye's depth of focus, thereby improving near vision with minimally discernible blur for intermediate vision or distance vision. More specifically, the dynamic ocular factors of the eye work in conjunction with the positive ADD power provided by the central optical zone of the lens and with the effective ADD gained from the negative spherical aberration provided by the peripheral optical zone of the lens to induce a minimally discernible amount of blur that is tuned to maximize the individual's depth of focus.

The power profiles 40, 50 and 60 each have a maximum ADD power in the central optical zone, i.e., at the intercepts of the curves on the vertical axis, and provide negative spherical aberration in the peripheral optical zone of the lens. In the example represented by FIG. 2, the maximum ADD power in the central optical zone for profile 40 is about 0.3 diopters, the maximum ADD power in the central optical zone for profile 50 is about 0.9 diopters, and the maximum ADD power in the central optical zone for profile 60 is about 1.6 diopters. The invention is not limited to these ADD powers. The maximum ADD power typically ranges from about 0 diopters to about 2.4 diopters at the center of the central optical zone 10. The minimum ADD power typically ranges from about 0 diopters to about 0.2 diopters at the center of the central optical zone 10. The amplitudes (i.e., the dc bias component) and the functional forms of the ADD parameters that define the profiles are designed to work with individuals' residual accommodation to provide a smooth, constant visual acuity level through vergence.

As indicated above, the power profile that is selected for the wearer depends on the dynamic ocular factors of the wearer's eye. A profile having a higher amplitude ADD in the central optical zone will bring the near point closer, but will result in both reduction in intermediate vision and more visual compromise through vergence. Therefore, the maximum ADD power of the central optical zone is selected based on the dynamic ocular factors of the eye so that the selected ADD power and the effective ADD gained from the negative spherical aberration provided by the peripheral optical zone of the lens induce a minimally discernible amount of blur tuned to maximize the individual's depth of focus.

The minimum ADD power in the central optical zone 10 occurs at the boundary of the central optical zone 10 and the transition zone 30. The distance from the lens center at which the central optical zone 10 ends and the transition zone 30 begins will vary depending on the lens design. As indicated above with reference to FIG. 1, the central optical zone 10 typically has a diameter that ranges from about 2.0 to about 4.0 mm and preferably is about 3.0 mm. This corresponds to a radial distance from the lens center, i.e., a semi-diameter, of about 1.0 mm to about 2.0 mm. The minimum ADD power of the central optical zone is selected based on the dynamic ocular factors of the eye so that the selected minimum ADD power and the effective ADD gained from the negative spherical aberration provided by the peripheral optical zone of the lens induce a minimally discernible amount of blur tuned to maximize the individual's depth of focus. Negative spherical aberration, as that term is used herein, means that light rays received through the peripheral region of the pupil are focused behind the retina while light rays received through the pupil center are focused on the retina.

A lens having the profile 40 is generally intended for a people experiencing symptoms of pre-Presbyopia, often referred to as emerging presbyopes. In the central optical zone 10, the profile 40 has lower ADD powers than the ADD powers of profiles 50 and 60. For an intermediate presbyope, i.e., a person who has begun to experience symptoms of Presbyopia, which typically happens at around age 40, the residual accommodation of the eye is typically only slightly less than that required to focus clearly on objects that are close to the eye. For these individuals, a lens having the profile 50 would be suitable because the ADD power is slightly greater than that provided by profile 40 in the central vision zone, but still less than that which would traditionally by used for these individuals. For more advanced presbyopic individuals, a lens having profile 60 provides a higher ADD power across then entire central optical zone than that provided by profiles 40 and 50, but still less ADD power than that traditionally used for lenses designed for these individuals.

Figure 3:
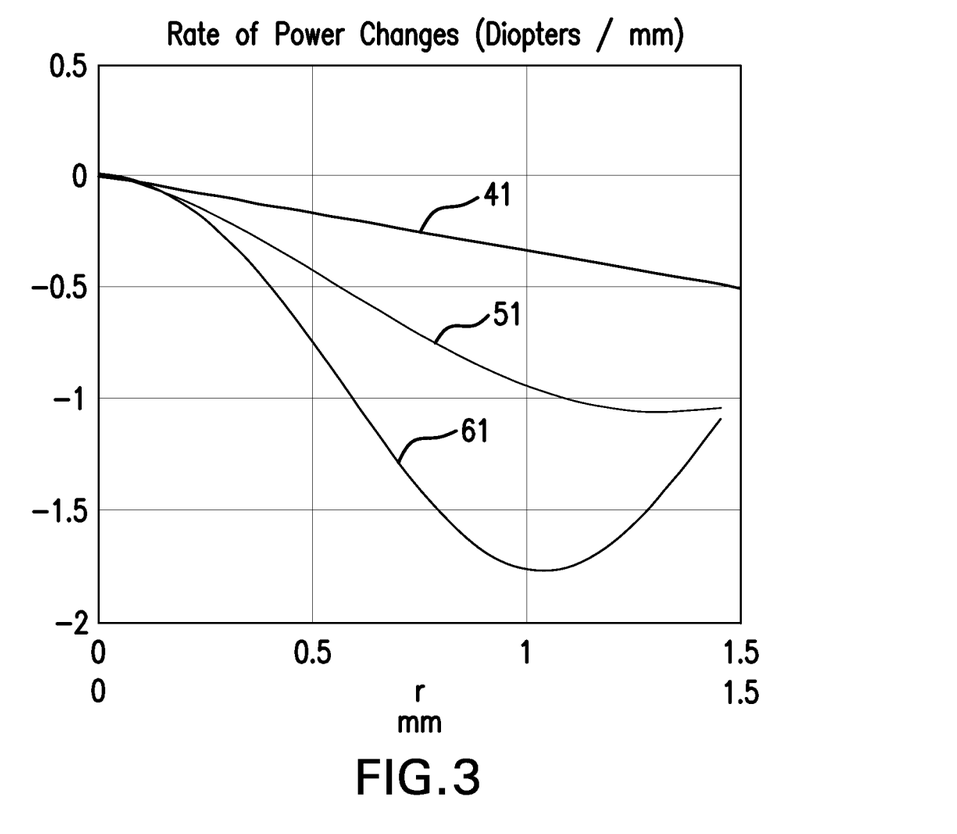
FIG. 3 illustrates a plot of three different curves that represent the rates of change of the three profiles shown in FIG. 2 in diopters/mm across the central optical zone.

FIG. 3 illustrates a plot of three different curves 41, 51 and 61 that represent the rates of power change of the profiles 40, 50 and 60, respectively, shown in FIG. 2 in diopters/mm across the central optical zone 10. The curves 41, 51 and 61 are obtained by taking the first derivative of profiles 40, 50 and 60 from r=0 mm to r=1.5 mm. The rate of power change in the central optical zone should be appropriate for the eyes' residual accommodation. For optimal vision, the rate of power change over the central optical zone should be a smoothly varying function. The rate of power change in the central optical zone typically has a minimum absolute value of about 0.15 diopters and a maximum absolute value of about 0.8 diopters at a semi-diameter of about 0.5 mm from the center of the lens. At a semi-diameter of about 1.0 mm from the center of the lens, the rate of power change in the central optical zone typically has a minimum absolute value of about 0.3 diopters and a maximum absolute value of about 2.0 diopters.

It can be seen that for profile 40, the corresponding rate of change 41 is constant (i.e., linear) across the central optical zone 10. It can be seen that for profile 50, the corresponding rate of change 51 increases in magnitude from the center of the lens out to a radius of about 1.0 mm, but then is generally constant from a radius of about 1.0 mm to a radius of about 1.45 mm. It can be seen that for profile 60, the corresponding rate of change 61 increases from the center of the lens out to a radius of about 1.0 mm, and then decreases from a radius of about 1.0 mm out to a radius of about 1.45 mm.

The invention is not limited to the profiles shown in FIG. 2. Different mathematical functions and/or different ADD powers from those represented by profiles 40, 50 and 60 can be used to define profiles that achieve the goals of the invention. The mathematical functions that are used to define the power profiles are not limited to any particular type or class of mathematical function. Each profile may be defined by a single mathematical function, such as a polynomial function, or it may be defined by a piece-wise function made up of multiple mathematical functions. The profiles may also be defined by other functions, such as, for example, linear functions, spline functions (e.g., cubic splines and bicubic splines), Seidel functions, Zernike functions, conic functions and biconic functions.

For example, the curves 51 and 61 shown in FIG. 3 are discontinuous at a radius of about 1.45 mm from the center of the central optical zone 10. However, because the functions that represent the profiles 50 and 60 shown in FIG. 2 are continuous and therefore differentiable in the first derivative, the profiles 40, 50 and 60 are suitable for lens designs for Presbyopia treatment. Because the profiles need not be differentiable in the second derivative, a wider variety of mathematical functions may be used to define the profiles, including piece-wise functions and splines.

The invention is not limited with respect to the behavior of the power profiles in the transition zone 30 (FIG. 1). Preferably, the profile is continuous over the transition zone 30 to prevent vision from being affected by artifacts, also commonly referred to as ghosting. Another way of stating that the profile is continuous over the transition zone 30 is to state that the profile is differentiable in at least the first derivative over the transition zone 30. For the higher ADD power profiles 50 and 60 shown in FIG. 2, the continuous changes in the rate curves 51 and 61 shown in FIG. 3 from the center of the central optical zone 10 almost to the transition zone 30 (1.5 mm from center) ensure that vision is not degraded by visual artifacts or ghost images.

Figure 4:
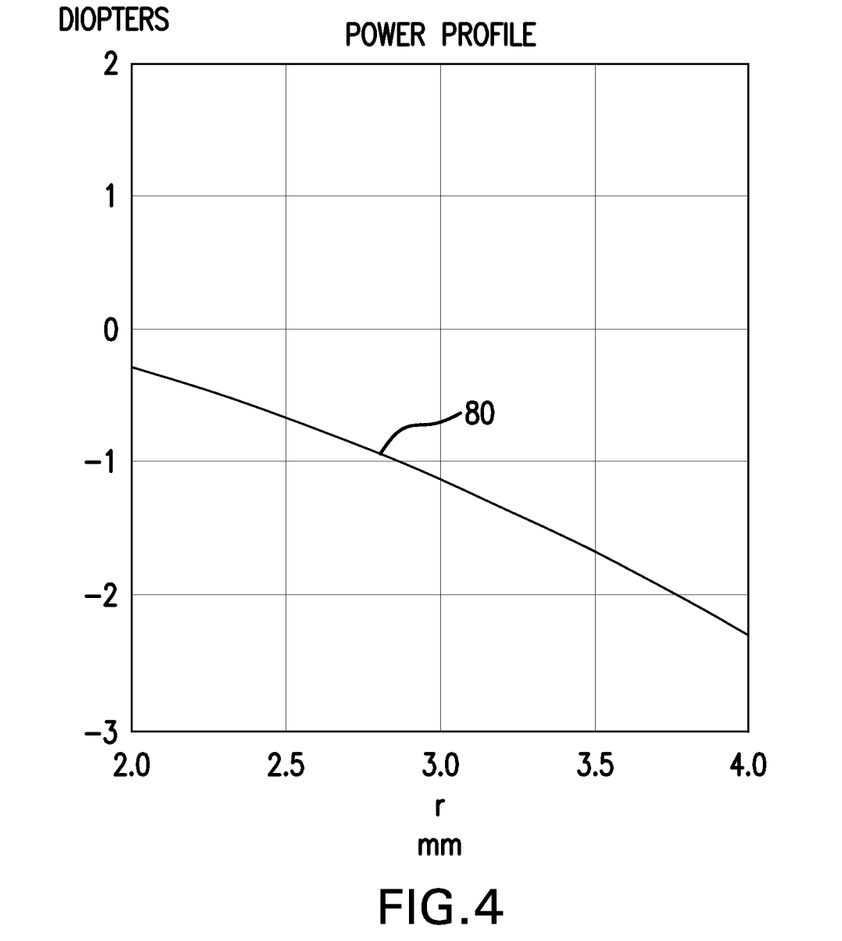
FIG. 4 illustrates a plot of a portion of the power profile in the peripheral optical zone shown in FIG. 1 extending from about 2.0 mm to about 3.0 mm from the center of the lens.

FIG. 4 illustrates a plot of a portion of the power profile 80 in the peripheral optical zone 20 extending from about 2.0 mm to about 4.0 mm from the center of the lens 1 (FIG. 1). As indicated above, the power profile in the peripheral optical zone 20 provides an amount of negative spherical aberration. The amount of negative spherical aberration will typically range from about −0.1 to about −0.7 diopters at the boundary of the peripheral optical zone 20 and the transition zone 30 to about −2.0 diopters to about −2.7 diopters at the boundary of the peripheral optical zone 20 and the outer peripheral region 25. As indicated above, the effect of this spherical aberration is that it provides an amount of effective ADD that works in conjunction with the positive ADD provided by the central optical zone 10 and the ocular dynamics of the eye to induce a minimally discernible amount of blur tuned to maximize the individual's depth of focus.

Figure 5:
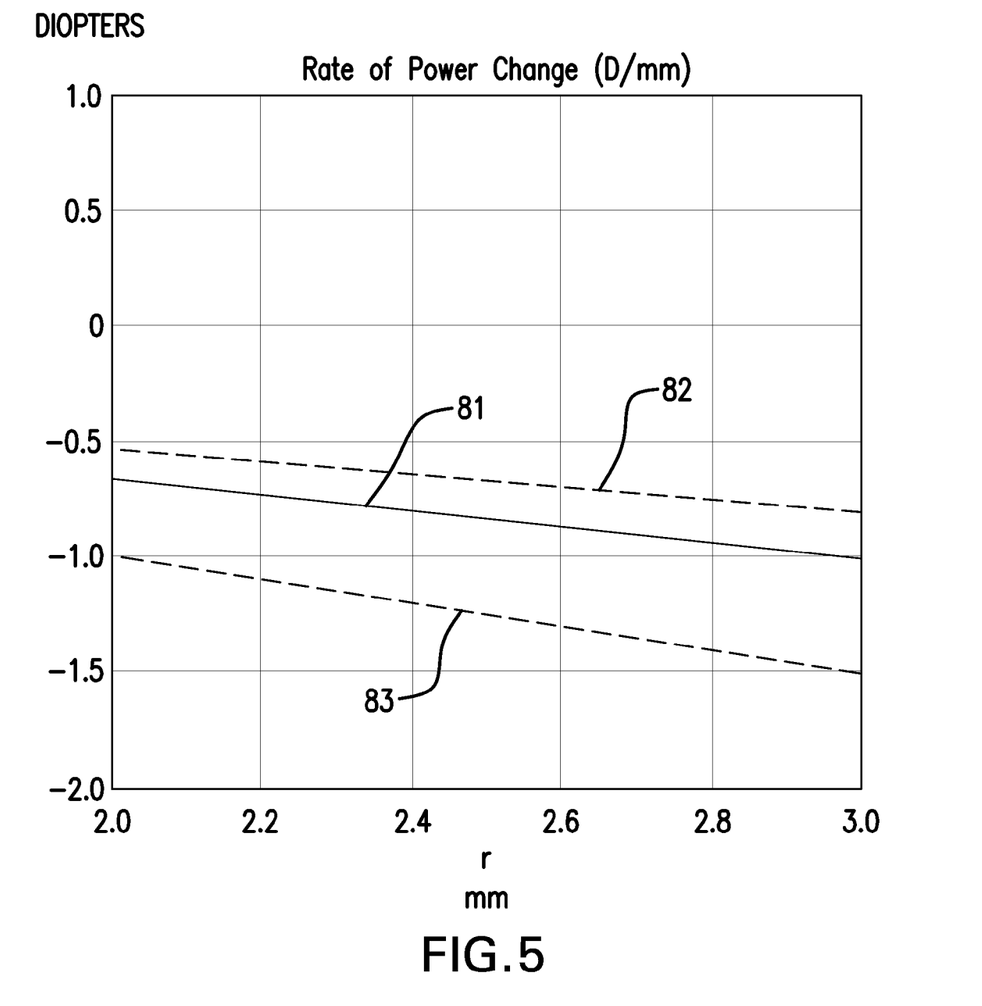
FIG. 5 illustrates a plot of a curve 81 that represents the rate of change of the profile shown in FIG. 4 in diopters/mm across the peripheral optical zone.

FIG. 5 illustrates a plot of a curve 81 that represents the rate of power change of the profiles 40, 50 and 60 in diopters/mm across the peripheral optical zone 20. The curve 81 is obtained by taking the first derivative of any one of the profiles 40, 50 and 60 from r=2.0 mm to r=3.0 mm, i.e., by taking the first derivative of the profile 80 shown in FIG. 4. The dashed lines 82 and 83 represent bounding functions that represent the typical power ranges across the peripheral optical zone 20. It can be seen from FIG. 5 that the rate of change across the peripheral optical zone 20 increases in magnitude in the direction away from the center of the lens and has a magnitude of about −0.67 diopters/mm at a radius of about 2 mm and a magnitude of about −1.00 diopters/mm at a radius of about 3 mm. Although it cannot be seen in FIG. 5 due to the X-axis stopping at a radius of 3 mm, the rate of change has a magnitude of about −1.33 diopters/mm at a radius of about 4 mm. Looking at the bounding functions 82 and 83, the rate of power change across the peripheral optical zone 20 ranges in magnitude from a magnitude of about −0.5 diopters/mm at a radius of about 2 mm to a magnitude of about −1.5 diopters/mm at a radius of about 3 mm at the boundary of the peripheral optical zone 20 and the transition zone 30 to a maximum absolute value of about 1.5 diopters at the boundary of the peripheral optical zone 20 and the outer peripheral region 25.

Since the spherical aberration of the eye is essentially independent of refractive error, the negative spherical aberration for a lens series preferably will be generally equal for all lenses of the series or will vary only by a small amount over the peripheral optical zone for different lenses of the series. Providing the proper magnitude range of negative spherical aberration in the peripheral optical zone 20 increases depth of focus by providing a visually tolerable amount of image blur to extend depth of focus while taking into account the pupil dynamics of the visual system at vergence (myosis). As stated above, negative spherical aberration, as that term is used herein, means that light rays received through the peripheral region of the pupil are focused behind the retina while light rays received through the pupil center are focused on the retina. Equivalently stated, the periphery of the pupil has less power than the center of the pupil.

Defining the spherical aberration (SA) as the absolute value of the difference in negative spherical aberration between a 2 mm semi-diameter zone and a 3 mm semi-diameter zone, as shown in FIG. 5, then the preferred ranges of SA values are:

SA(min)=0.65 diopters

SA(max)=1.25 diopters

SA(nominal)=0.85 diopters

Preferably, for all ADD parameters, spherical aberration in the peripheral optical zone will be equal. For toric multifocal lenses, the above ranges are valid along the Sphere meridians. The peripheral optical zone 20 may be described by Zernike polynomials, aspheric terms, or the equivalent. The power profile in the peripheral optical zone 20 may be described by a quadratic or a perturbed quadratic power function.

Figure 6:
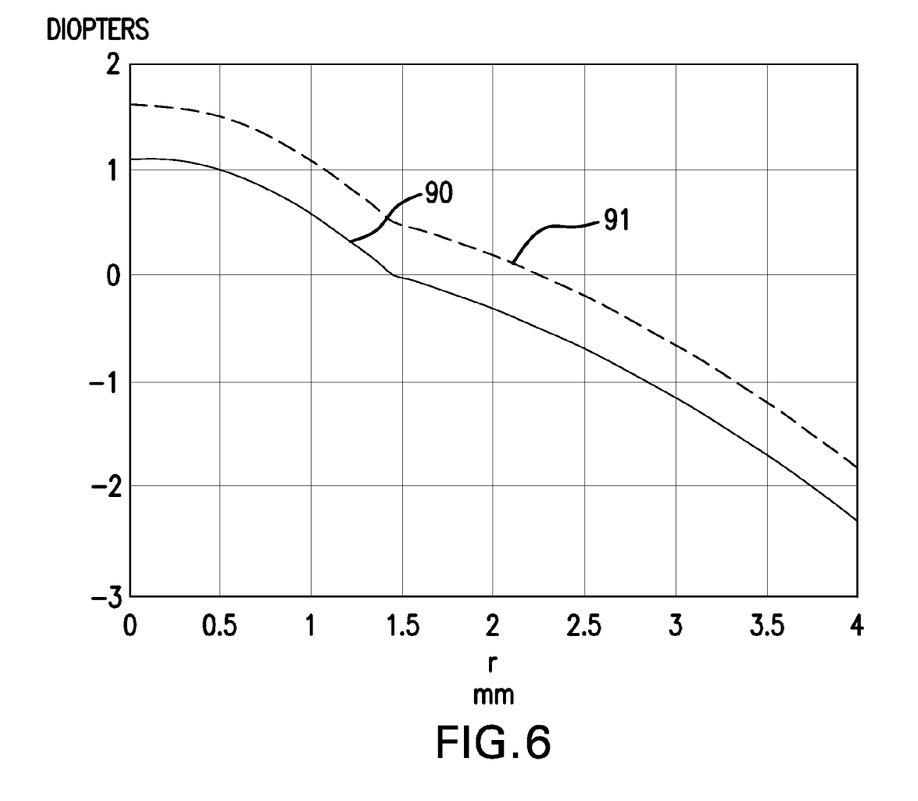
FIG. 6 illustrates two power profiles of two lenses of the same series that have different dc bias terms in accordance with an embodiment of the invention.

As stated above, for a given lens series, preferably each lens will have a power profile defined the same ADD parameter, but the dc bias term will be different for each lens of the series. FIG. 6 illustrates two power profiles 90 and 91 of two lenses of the same series that have different dc bias terms in accordance with an embodiment of the invention. Thus, the mathematical functions that define the profiles 90 and 91 are identical except for the dc bias terms. The dc bias term corresponds to the location at which the profile intersects the Y-axis. This value is obtained by setting all of the X-axis terms of the function equal to zero such that the value of the function corresponds to the dc bias term, i.e., the constant in the equation.

In accordance with another embodiment of the invention, it has been determined that over-plusing the near eye by a small magnitude will sometimes result in an improvement in the treatment of Presbyopia. In cases where the distance eye is the dominant eye or has the least amount of astigmatism, over-plusing the near eye by a small amount increases depth of focus. The term "over-plusing" as that term is used herein, means fitting an eye with a lens having a profile defined by the same ADD parameter as another lens of the series used for the other eye, but that also has a greater dc bias term than the other lens of the series. For example, with reference to FIG. 6, the near eye would be fitted with a lens having profile 91 whereas the distance eye would be fitted with a lens having the profile 90.

Although the invention has been described above with reference to contact lenses, the invention applies equally to phakic or aphakic lenses, as well as to optical power profiles created by performing corneal ablation. In addition, although the invention has been described with reference to the simultaneous vision lens shown in FIG. 1, lenses in accordance with the invention may also be used for modified monovision since the power profiles described herein reduce the disparity between distance and near powers.

Figure 7:
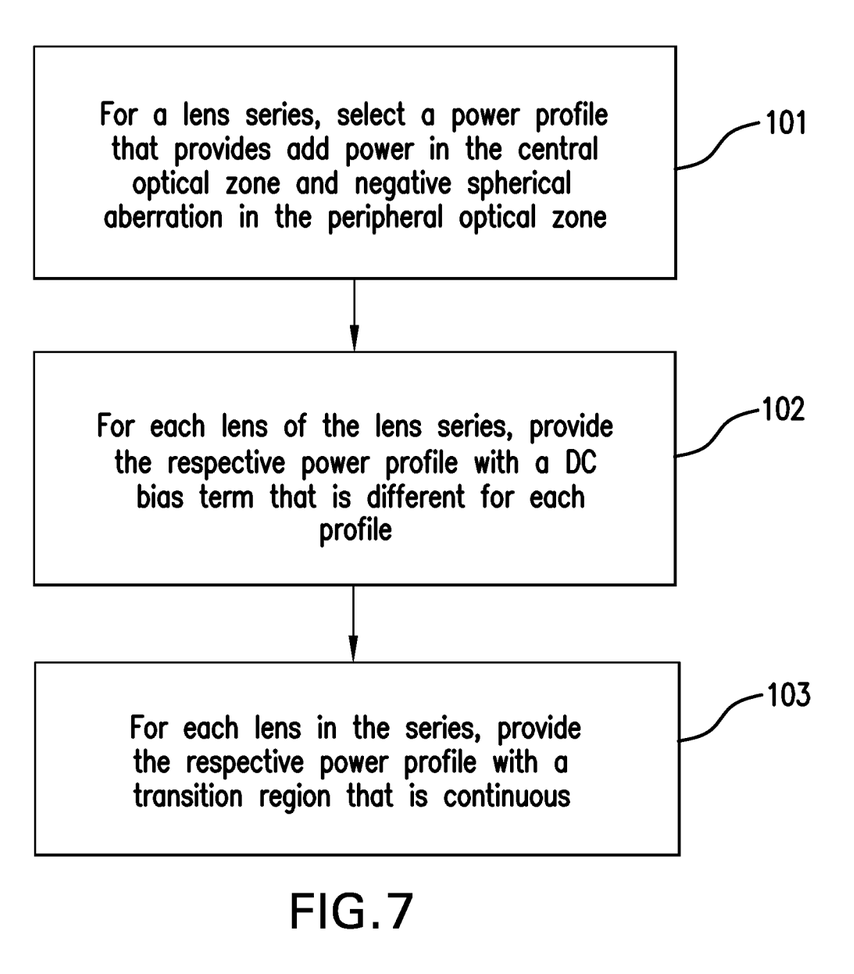
FIG. 7 illustrates a flowchart that represents the method of the invention in accordance with an illustrative embodiment for providing a lens series for treating Presbyopia.

FIG. 7 illustrates a flowchart that represents the method of the invention in accordance with an illustrative embodiment for providing a lens series for treating Presbyopia. A lens series is provided such that each lens of the series has a power profile that provides ADD power in the central optical zone and negative spherical aberration in the peripheral optical zone, as indicated by block 101. The maximum ADD power preferably occurs at the center of the central optical zone 10 (FIG. 1) and the minimum ADD power preferably occurs at the boundary between the central optical zone 10 and the transition zone 30. For each lens of the lens series, the respective power profile is provided with different dc bias term, as indicated by block 102. Each lens of the lens series has a power profile in the transition region that preferably is continuous, as indicated by block 103, which means that the profile in the transition region is differentiable in at least the first derivative, but not necessarily in the second or higher derivatives.

It should be noted that the invention has been described with reference to a few preferred and illustrative embodiments and that the invention is not limited to these embodiments. Persons skilled in the art will understand that modifications can be made to the embodiments described herein and that all such modifications are within the scope of the invention. For example, persons skilled in the art will understand, in view of the description provided herein, that the invention is not limited to a lens having one of the power profiles described above with reference to FIG. 2. As indicated above a variety of mathematical functions and ADD parameters may be used to described power profiles that meet the objectives of the invention of treating Presbyopia without sacrificing intermediate and/or distance vision. Also, although the method described above with reference to FIG. 6 indicates separate processes for selecting the power profiles for the central optical zone, the peripheral optical zone and the transition zone, this may be accomplished in a single process during which a single power profile is selected that meets all of the requirements for each of these zones.

What is claimed is:

1. A multifocal contact lens comprising:
   a central optical zone having a power profile that provides an ADD power ranging from a maximum ADD power of between about 0 diopters and about 2.4 diopters and a minimum ADD power of between about 0 diopters and about 0.2 diopters;
   a peripheral optical zone having a power profile that provides an amount of negative spherical aberration-between an inner semi-diameter of about 2 millimeters (mm) and an outer semi-diameter of about 3 mm, wherein the difference between the amount of negative spherical aberration provided by the power profile of the peripheral optical zone at the inner semi-diameter and the amount of negative spherical aberration provided by the power profile of the peripheral optical zone at the outer semi-diameter ranges from a minimum absolute value of about 0.65 diopters and a maximum absolute value of about 1.25 diopters; and
   a transition zone interposed between and connected to the central optical zone and the peripheral optical zone, the transition zone providing a transition between the central optical zone and the peripheral optical zone, the transition zone having a power profile that is continuous.

2. The lens of claim 1, wherein said difference between the amount of negative spherical aberration provided by the power profile of the peripheral optical zone at the inner semi-diameter and the amount of negative spherical aberration provided by the power profile of the peripheral optical zone at the outer semi-diameter has an absolute value of about 0.85 diopters.

3. The lens of claim 1, wherein the power profile of the central optical zone is continuous.

4. The lens of claim 3, wherein the power profile of the peripheral optical zone is continuous.

5. The lens of claim 1, wherein the maximum ADD power provided by the power profile of the central optical zone is about 1.6 diopters.

6. The lens of claim 1, wherein the maximum ADD power provided by the power profile of the central optical zone is about 0.9 diopters.

7. The lens of claim 1, wherein the maximum ADD power provided by the power profile of the central optical zone is about 0.3 diopters.

8. The lens of claim 1, wherein a rate of power change in the central optical zone is discontinuous at the interconnection of the central optical zone and the transition zone.

9. The lens of claim 1, wherein a rate of power change in the peripheral optical zone is continuous.

10. The lens of claim 9, wherein a rate of change in the central optical zone is substantially constant.

11. The lens of claim 1, wherein the lens is a toric multifocal lens.

12. A lens series comprising multifocal contact lenses, each lens of the series comprising:
  a central optical zone having a power profile that provides a selected amount of ADD power;
  a peripheral optical zone having a power profile that provides a selected amount of negative spherical aberration;
  the central optical zone having a power profile that provides an ADD power ranging from a maximum ADD power of between about 0 diopters and about 2.4 diopters and a minimum ADD power of between about 0 diopters and about 0.2 diopters;
  peripheral optical zone having a power profile that provides an amount of negative spherical aberration between an inner semi-diameter of about 2 millimeters (mm) and an outer semi-diameter of about 3 mm, wherein the difference between the amount of negative spherical aberration provided by the power profile of the peripheral optical zone at the inner semi-diameter and the amount of negative spherical aberration provided by the power profile of the peripheral optical zone at the outer semi-diameter ranges from a minimum absolute value of about 0.65 diopters and a maximum absolute value of about 1.25 diopters; and
  a transition zone interposed between and connected to the central optical zone and the peripheral optical zone, the transition zone providing a transition between the central optical zone and the peripheral optical zone; and
  wherein each lens of the series has a power profile that is defined by a mathematical function, each of the mathematical functions being identical except that the dc bias terms for each lens of the series are different.

13. The lens series of claim 12, wherein the power profile has a rate of power change in the central optical zone that is discontinuous at the interconnection of the central optical zone and the transition zone.

14. The lens series of claim 12, wherein the power profile has a rate of power change in the peripheral optical zone that is continuous between a semi-diameter of about 2 millimeters (mm) from a center of the lens and a semi-diameter of about 3 mm from the center of the lens.

15. The lens series of claim 12, wherein the power profile has a rate of power change in the peripheral optical zone that has an absolute value that ranges from about 0.50 diopters to about 1.00 diopters at a distance of about 2.0 millimeters (mm) from a center of the lens and has an absolute value that ranges from about 0.75 diopters to about 1.50 diopters at a distance of about 3.0 mm from the center of the lens.

16. The lens series of claim 15, wherein the power profile has a rate of power change in the peripheral optical zone that has an absolute value of about 0.65 diopters at a distance of about 2.0 mm from the center of the lens and that has an absolute value of about 1.00 diopters at a distance of about 3.0 mm from the center of the lens.

17. The lens series of claim 12, wherein the power profile has a rate of power change in the central optical zone that has an absolute value that ranges from about 0.15 diopters to about 0.8 diopters at a distance of about 0.5 millimeters (mm) from a center of the lens and has an absolute value that ranges from about 0.3 diopters to about 2.0 diopters at a distance of about 1.0 mm from the center of the lens.

18. The lens series of claim 12, wherein the transition zone has a power profile that is continuous.

* * * * *